United States Patent [19]

Kornbaum

[11] Patent Number: 5,166,241

[45] Date of Patent: Nov. 24, 1992

[54] PROCESS FOR STABILIZING MIXTURES BASED ON HALOGENATED POLYMERS

[76] Inventor: Simon Kornbaum, 213, rue Benjamin Delessert, F-69300 Caluire-et Cuire, France

[21] Appl. No.: 457,768

[22] PCT Filed: Jun. 22, 1988

[86] PCT No.: PCT/FR88/00332

§ 371 Date: Nov. 22, 1989

§ 102(e) Date: Nov. 22, 1989

[87] PCT Pub. No.: WO88/10282

PCT Pub. Date: Dec. 29, 1988

[30] Foreign Application Priority Data

Jun. 26, 1987 [FR] France ............... 87 09279

[51] Int. Cl.$^5$ ............... C08K 5/57; C08K 5/56; C08K 5/37

[52] U.S. Cl. ................ 524/175; 252/406; 524/176; 524/177; 524/178; 524/180; 524/289; 524/304; 524/305; 524/330; 524/331; 524/333; 524/392; 524/434; 524/435

[58] Field of Search ............ 524/175, 176, 177, 178, 524/180, 181, 289, 304, 305, 392, 330, 331, 333, 434, 435; 252/406

[56] References Cited

U.S. PATENT DOCUMENTS

| | | | |
|---|---|---|---|
| 2,563,772 | 8/1951 | Cheney | 524/435 |
| 3,063,963 | 11/1962 | Wooten et al. | 524/181 |
| 4,021,407 | 5/1977 | Gough et al. | 524/180 |
| 4,159,261 | 6/1929 | Dieckmann | 524/175 |
| 4,360,619 | 11/1982 | Kugele et al. | 524/329 |
| B1 4,360,619 | 7/1988 | Kugele et al. | 524/181 |
| 4,616,046 | 10/1986 | Kornbaum et al. | 524/181 |
| 4,665,114 | 5/1987 | Kugele et al. | 524/289 |

FOREIGN PATENT DOCUMENTS

| | | |
|---|---|---|
| 2434835 | 3/1980 | France . |
| 160044 | 12/1980 | Japan . |
| 2336 | 1/1981 | Japan . |
| 335957 | 8/1972 | U.S.S.R. . |
| 519446 | 6/1976 | U.S.S.R. . |

OTHER PUBLICATIONS

Z. Vymaral: *Plasty A. Kauck* 23, No. 9, 271-274 (1986).

Starnes et al: *Macromolecules*, vol. 9, No. 4, 633-640 (1976).

T. Iida et al: *J. Polymer Science*, vol. 15, 2435-2440 (1977).

H. O. Wirth: *J. Vinyl Technology*, vol. 1, No. 1, 51-53 (1979).

*Primary Examiner*—Veronica P. Hoke
*Attorney, Agent, or Firm*—Horst M. Kasper

[57] ABSTRACT

Thiol compounds are combined with an onrganometallic halide or metallic halide to provide thermal stability to vinyl halide polymers.

2 Claims, No Drawings

PROCESS FOR STABILIZING MIXTURES BASED ON HALOGENATED POLYMERS

This invention concerns a stabilization process for vinyl chloride homopolymer and/or copolymer-based blends during processing as well as the stabilisation systems for this purpose.

The process invented employs stabilizing compositions aimed at protecting vinyl chloride homopolymers and copolymers (PVC) from the undesirable effects of heat when they pass through processing machines such as calenders, extruders, mixers, injection-moulding machines and gellation tunnels.

This process allows the initially desired colour to be obtained and colour stability and thermal stability to be maintained for sufficiently long periods.

It is common knowledge that PVC require the addition of chemical compounds in order to make them suitable for processing with heat. These compounds are commonly called thermal stabilizers, and they have four roles to play:

a) to ensure the desired colour or absence of colour;

b) to maintain the initial colour of the melt, without embarrassing change, for a sufficiently long period;

c) to prevent the thermal degradation of the melt for a sufficiently long period and d) in the case of finished products which must be transparet, not to alter the intrinsic transparency of the polymer.

During processing, the temperature of the melt in the case of PVC is between 160° C. and 230° C. according to different factors: the nature of the PVC (flexible or rigid), the K value of the PVC and finally the shearing rate the melt is subjected to in the machine. In general the temperature of flexible PVC is between 160° C. and 190° C. and that of rigid PVC between 200° C. and 230° C.

The length of colour stability and thermal stability for a given blend is inversely proportional to the temperature of the melt. For every 10° C. rise in temperature, the length is reduced approximately by half. This means, for example, that a thermal stabilization system which is adequate for the processing of a flexible PVC at 180° C., can be totally unsuitable for the processing of rigid PVC at 220° C.

These technological particularities and considerations of stabilization cost explain why such a great range of thermal stabilizers is offered by producers in order to satisfy the large and varied market of PVC processing.

The use of organic compounds containing —SH functions as PVC stabilizers in combination with other known thermal stabilizers has been proposed.

For example, they are used:

in association with Ba, Sr, Ca, Cd, Zn, Pb, Sn, Mg, Co, Al, Ni, Ti salts of phenols, aromatic carboxylic acids, fatty acids and epoxydized fatty acids (U.S. Pat. No. 3,144,422);

in association with dialkylated tin carboxylates (U.S. Pat. No. 3,063,963);

in association with organo-tin oxides or organo-antimony oxides (DE-C-1 217609).

U.S. Pat. No. 3,715,333 mentions the association of organo-tin trichloride with a thio-organo-tin of general formula $R_2 Sn(SR')_2$.

However, thio-organo-tin type stabilizers occupy a privileged position, especially those which correspond to the following formula:

$R_{1\ or\ 2}\ Sn(SCH_2COOC_6H_{17})_{3\ or\ 2}$ wherein R=methyl, butyl or octyl.

At present, this type of stabilizer is the only one able to fulfil in the simplest conditions the four-fold role mentioned above, in the case of rigid PVC processing at temperatures between 200° C. and 230° C. These stabilizers are almost exclusively used for the processing of PVC into sheets and transparent rigid films, hollow bodies—except mineral-water bottles for organo-leptic reasons—and rigid tubes in the USA and Japan and partly in Europe, as a substitute for stabilizers containing lead.

The main disadvantages of these stabilizers are the complexity of their manufacture, the high tin content (14% to 20%), and the high cost.

The object of the present invention is to give compositions of thermal stabilizers which are capable of the same performances as thio-organo-tin type stabilizers in the processing of rigid PVC but which offer important advantages: simplicity of manufacture, reduction of the metal content to about 1% and a considerable reduction in the cost of stabilization.

The inventor discovered to his surprise that if a very small quantity of metallic or organo-metallic halide was added to blends of rigid PVC containing one or more —SH functions (thiol compound), the result was a remarkable improvement in the initial colour, a lengthening of the colour stability and of the thermal stability. These results were all the more surprising as certain metallic halides are well-known for their negative influence on the thermal stability of PVC.

The inventor found that in the case of organo-metallic halides, the improvements were progressive up to a certain added quantity, beyond which the length of colour and thermal stability both diminished.

These observations lead to a new concept in the field of PVC stabilization, namely that certain metallic halides in the presence of thiol compounds have a contrasting action which can help or hinder PVC colour and thermal stability according to the quantity added.

Furthermore, metallic halides—without organic radicals—added in very small quantities to PVC blends containing thiol compound, produce effects which are similar to those of organo-metallic halides, but the intensity of these effects depends on the degree of acidity of the metallic halide.

The stabilization process for PVC according to the invention is characterized by the addition to the polymer to be protected of a system consisting of at least one thiol-ester containing one or more —SH functions and a very small quantity of at least one halide chosen from metallic and organo-metallic halides.

The thiol-esters used in the process concerned by the invention present the following general formula:

$$R(R'—SH_x)_y \hspace{2em} (I)$$

wherein:

R is the radical derived from a monohydroxylic aliphatic, olefinic, cyclic, or aromatic alcohol or a monomeric polyol such as: glycerine, glycol, pentaerythrite, sorbitol, pentites, hexites, monosaccharides, or a polymeric polyol such as: polyethylene-glycol, polypropylene-glycol, polyvinylic alcohol, include various functions such as etheroxide, and carboxylic, thiocarbonic, sulfonic ester and/or esters of other anorganic acids.

R'—SH$_x$ is the radical of a mono- or poly-carboxylic acid containing one or more —SH functions linked to R by esterification such as for example thioglycolic, mercapto-propionic, mercaptosuccinic, dimercaptosuccinic, and thiosalicylic acid.

x is the number of —SH linked to R'.

y is the number of R'—SH$_x$ linked to R.

The added quantity of thiol-ester containing one or more —SH functions is between 0.1 and 5 parts weight for 100 parts weight of resin.

The organo-metallic halides and/or metallic halides used in the process concerned by the invention present the following general formula:

$$R_nMe(v)Hal_{v-n} \qquad (II)$$

wherein:

R is an aliphatic, cyclic, heterocyclic, aromatic hydrocarbon radical.

n=0 to v-1.

Me=Sn, Al, Sb, Fe, Cd, Zn, Cu, Ti, Hg, Bi, Mn, or Ga.

v is the valency of the Me

Hal=chlorine, bromine, iodine, fluorine.

An organo-metallic or metallic halide of a single chemical species can be used, or a mixture of at least one organo-metallic halide and/or at least one metallic halide.

The quantity of halide(s) expressed by its halogen content is between 0.1 and 30 milliequivalents of halogen per kg of resin.

Because only a very small quantity is necessary, the halide should be easy to measure and disperse homogeneously in the PVC mixture. Consequently, the halide should be diluted in a solvent or an appropriate medium, for example, in one or more of the constituents of the mixture.

In the present description, the term 'blend' corresponds to the matter destined for processing, obtained by homogenization of several constituents, and whose basic constituent is PVC and which also contains, besides the additives I and, II described above, one or more other ingredients such as: impact modifiers, processing aids, known PVC stabilizers, plastifiers, fillers, pigments, anti-static additives and any other ingredients.

The present invention will be better understood and its advantages will be made clear in the light of the following examples which are non-limitative illustrations.

PVC blends whose ingredients are given for each example are prepared in a high-speed laboratory mixer. The quantities of the ingredients are indicated in weight parts per 100 weight parts of PVC (phr). The quantities of organo-metallic and metallic halides are moreover given in brackets by the halogen content, expressed in milliequivalents of halogen per kg of PVC.

Test Method Allowing the Initial Colour and Colour and Thermal Stability to be Determined A 60-gramme portion of blend is malaxed on a two-roll laboratory mill whose rolls are heated to 210° C. by the circulation of oil. The two rolls are 250 mm in diameter. During the test the distance between the rolls is kept constant at 0.6 mm. The rotation speed of the rolls is 18 r.p.m. and 20 r.p.m. respectively. A small rectangular sample is taken every minute. The samples are attached successively to a cardboard display-board. The initial colour is judged visually on the sample taken after two minutes. Colour stability is determined by the malaxing-time resulting in a change in the initial colour visible to the naked eye. The thermal stability is determined by the malaxing-time resulting in a change in colour to dark brown or dark red.

The thiol-ester pentaerythrite tetra-mercaptoacetate, is prepared in the laboratory by esterification of a mole of pentaerythrite containing about 49% of —OH functions, with four moles of mercaptoacetic acid, of an iodometric purity of 99%.

First, the acid with 2% water and 0.25% sulfonic para-toluene acid is put into the reactor. At 80° C., the pentaerythrite is added; then, the temperature is maintained at 145° C. until no more water is eliminated. Then 0.25% of calcium carbonate is added and a filtration is carried out while it is hot.

EXAMPLE 1

| Constituents | Blends | |
|---|---|---|
| | A | B |
| PVC "Lacqvyl S 071 s", K = 58 from ATOCHEM | 100 | 100 |
| Impact Modifier BTA III F from ROHM and HAAS | 7 | 7 |
| Lubricant AC 316 A from ALLIED CHEMICAL | 0.3 | 0.3 |
| Lubricant Lacer BN from LA CERESINE | 0.45 | 0.45 |
| Epoxydized soya bean oil | 1 | 1 |
| Pentaerythrite tetra mercaptoacetate | 1 | 1 |
| Tin mono-n-octyl trichloride (MOTCl) from SCHERING | — | 0.017 (1.45) |

| | Test results | |
|---|---|---|
| Blend | Initial Colour | Colour Stability | Thermal Stability |
| A | yellowish | under 2 minutes | between 3 and 4 minutes |
| B | yellowish | 9 minutes | 12 minutes |

The addition of a very small quantity of the tin mono-n-octyl trichloride quadruples the colour and thermal stability.

EXAMPLE 2

| Ingredients | Blend | | | |
|---|---|---|---|---|
| | C | D | E | F |
| PVC "Lacqvyl S 071 s" | 100 | 100 | 100 | 100 |
| BTA III F | 7 | 7 | 7 | 7 |
| AC 316 A | 0.3 | 0.3 | 0.3 | 0.3 |
| Lacer BN | 0.45 | 0.45 | 0.45 | 0.45 |
| Calcium Stearate | 0.2 | 0.2 | 0.2 | 0.2 |
| Zinc Stearate | 0.2 | 0.2 | 0.2 | 0.2 |
| Epoxydized soya bean oil | 1 | 1 | 1 | 1 |
| Pentaerythrite tetra mercaptoacetate | 1 | 1 | 1 | — |
| Tin mono-n-octyl trichloride | — (1.45) | 0.017 | — | — |
| Tin di-n-ocyyl dichloride (DOTCl) from SCHERING | — | — | 0.017 (0.82) | — |
| Thio-organo-tin stabilizer Ingastab 17 MOK from CIBA-GEIGY | — | — | — | 1 |

| | Test results | |
|---|---|---|
| Blend | Initial Colour | Colour Stability | Thermal Stability |
| C | yellow | 8 minutes | 14 minutes |
| D | almost colourless | 11 minutes | 11 minutes 30 seconds |
| E | light yellow | 11 minutes | 12 minutes |

-continued

| | | | |
|---|---|---|---|
| F | almost colourless | 11 minutes | 14 minutes |

On the one hand, we can see the very clear improvement in the initial colour thanks to the addition of organo-tin chloride, and on the other, the result obtained with the D blend which is comparable to that obtained with the Irgastab 17 MOK stabilizer.

EXAMPLE 3

| | Blend | | | |
|---|---|---|---|---|
| Ingredients | G | H | I | J |
| PVC "Lacqvyl S 071 s" | 100 | 100 | 100 | 100 |
| BTA III F | 7 | 7 | 7 | 7 |
| AC 316 A | 0.3 | 0.3 | 0.3 | 0.3 |
| Lacer BN | 0.45 | 0.45 | 0.45 | 0.45 |
| Calcium Stearate | — | — | 0.2 | 0.2 |
| Zinc Stearate | 0.2 | 0.2 | — | — |
| Epoxydized soya bean oil | 1 | 1 | 1 | 1 |
| Pentaerythrite tetra mercaptoacetate | 1 | 1 | 1 | 1 |
| Tin mono-n-octyl trichloride | 0.017 (1.45) | 0.051 (4.35) | 0.017 (1.45) | 0.034 (2.90) |

| | Test results | | |
|---|---|---|---|
| Blend | Initial Colour | Colour Stability | Thermal Stability |
| G | almost colourless | 8 minutes | 9 minutes |
| H | almost colourless | 5 minutes | 6 minutes |
| I | yellowish | 9 minutes | 19 minutes |
| J | light yellow | 13 minutes | 19 minutes |

Visibly:
— there exists a limit to the amount of organi-tin chloride to be added, beyond which colour and thermal stability diminishes.
— even in the presence of calcium soap, without addition of zinc stearate, light initial colours and excellent colour and thermal stability are obtained.

EXAMPLE 4

| | Blends | | | | |
|---|---|---|---|---|---|
| Ingredients | K | L | M | N | O |
| PVC "Lacqvyl S 071 s" | 100 | 100 | 100 | 100 | 100 |
| BTA III F | 7 | 7 | 7 | 7 | 7 |
| AC 316 A | 0.3 | 0.3 | 0.3 | 0.3 | 0.3 |
| Lacer BN | 0.45 | 0.45 | 0.45 | 0.45 | 0.45 |
| Epoxydized soya bean oil | 1 | 1 | 1 | 1 | 1 |
| Pentaerythrite tetra mercapto-acetate | 1 | 1 | 1 | 1 | |
| Tin tetra chloride | — | 0.0095 | 0.0285 | — | — |
| RPE from CARLO ERBA | | (1.45) | (4.35) | | |
| Cadmium dichloride | — | — | — | 0.0133 | 0.0399 |
| RPE from CARLO ERBA | | | | (1.45 | (4.35) |

The metallic halide is added to the blend as a diluted solution obtained by dissolving in 250 cc of distilled water 0.33 grammes of SnCl$_4$5H$_2$O or one gramme of CdCl$_2$2,5H$_2$O, both chemically pure. The tin tetrachloride solution shows a pH value of 1.5 at 23° C. and that of the cadmium dichloride a pH value of 5. Before the test on the two-roll mill, the blends were dried at 110° C. for 10 minutes in an oven.

Test Results

| Blend | Initial Colour | Colour Stability | Thermal Stability |
|---|---|---|---|
| K | yellowish | under 2 minutes | 4 minutes |
| L | yellowish | between 8 and 9 minutes | 11 minutes |
| M | almost colourless | 8 minutes | between 9 and 10 minutes |
| N | yellowish | under 2 minutes | between 5 and 6 minutes |
| O | yellowish | between 4 and 5 minutes | 10 minutes |

It can be seen that:

tin tetrachloride results in colour and thermal stability which are close to those obtained by tin mono-n-octyl trichloride, with the same chlorine content.

the efficiency of cadmium dichloride is, for an equal halogen content, far below that of tin tetrachloride, doubtless because of its less acidic nature.

The blends subjected to the process according to the invention can also contain usual additives such as impact modifiers, plasticizers, processing aids, lubricants, fillers, pigments, known thermal stabilizers and antistatic agents.

The invention also concerns thermal stabilizing systems used in the process according to the invention as well as the blends in any physical form, such as powder, pellets or paste obtained by using one of the heat stabilizing systems described by the invention.

I claim:

1. A thermal stabilizing composition for the protection of vinyl chloride homopolymer and/or copolymer based blends against the undesirable effect of heat during their passage through processing machines, wherein the the stabilizing composition consists essentially of at least one thiol-ester containing one or more —SH functions having the following general formula:

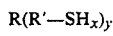

$R(R'—SH_x)_y$ wherein:
R is a radical derived from a monohydroxylic alcohol chosen amongst aliphatic, olefinic, cyclic, or aromatic alcohols, or a monomeric polyol chosen amongst glycerine, glycol, pentaerythrite, sorbitol, pentites, hexites, monosaccharides or a polymeric polyol chosen amongst polyethylene-glycol, polypropylene-glycol, polyvinylic alcohol, R'—SH$_x$ is a radical derived from a mono- or polycarboxylic acid, containing one or more —SH functions linked to R by esterification, chosen amongst thioglycolic, mercatopropionic, mercaptosuccinic, dimercaptosuccinic, and thiosalicylic acid, x indicates the number of —SH linked to R',
y indicates the number of R'—SH$_x$ linked to R, the quantity of thiol-ester(s) to add being between 0.1 to 5 parts by weight per 100 parts by weight of resin, and at least one halide chosen amongst organo-metallic halides or metallic halides presenting the following formula:

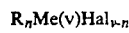

$R_nMe(v)Hal_{v-n}$ wherein:

R is aliphatic hydrocarbon radical, alicyclic hydrocarbon radical, cyclic hydrocarbon radical, olefinic hydrocarbon radical, or aromatic hydrocarbon radical, n=0 to v-1, Me=Sn, Al, Sb, Fe, Cd, Zn, Cu, Ti, Hg, Bi, Mn or Ga, v is the valency of the Me, Hal=chlorine, bromine, iodine, fluorine, or a blend of these halides, the quantity of halide(s) to add, expressed by its halogen content, being between 0.1 and 30 milliequivalents of halogen per kg of resin.

2. A composition comprising a blend based on homopolymers and/or copolymers of vinyl chloride which have been protected against the undesirable effects of heat during processing by incorporating a thermal stabilizing composition consisting essentially of at least one thiol-ester containing one or more —SH functions having the following formula:

$$R(R'\text{—}SH_x)_y$$

wherein:

R is a radical derived from a monohydroxylic alcohol chosen amongst aliphatic, olefinic, cyclic, or aromatic alcohols, or a monomeric polyol chosen amongst glycerine, glycol, pentaerythrite, sorbitol, pentites, hexites, monosaccharides or a polymeric polyol chosen amongst polyethylene-glycol, polypropylene-glycol, polyvinylic alcohol, R'—SH$_x$ is a radical derived from a mono- or polycarboxylic acid, containing one or more —SH functions linked to R by esterification, chosen amongst thioglycolic, mercaptopropionic, mercaptosuccinic, dimercaptosuccinic, and thiosalicyclic acids, x indicates the number of —SH linked to R', y indicates the number of R'—SH linked to R, the quantity of thiol-ester(s) being between 0.1 and 5 parts by weight per 100 parts by weight of resin, and at least one halide chosen amongst organo-metallic halides or metallic halides presenting the following formula:

$$R_nMe(v)Hal_{v-n}$$

wherein:

R is aliphatic hydrocarbon radical, alicyclic hydrocarbon radical, cyclic hydrocarbon radical, olefinic hydrocarbon radical, or aromatic hydrocarbon radical, n=0 to v-1, Me=Sn, Al, Sb, Fe, Cd, Zn, Cu, Ti, Hg, Bi, Mn, or Ga, v is the valency of the Me, Hal=chlorine, bromine, iodine, fluorine, or a blend of these halides, the quantity of halide(s) expressed by its halogen content, being between 0.1 and 30 milliequivalents of halogen per kg of resin.

* * * * *